US012597061B2

(12) United States Patent (10) Patent No.: US 12,597,061 B2
Park (45) Date of Patent: Apr. 7, 2026

(54) AUTOMATED ORDER PLACEMENT, PAYMENT, AND SHIPPING SYSTEM FOR ONLINE SHOP, AND METHOD OF OPERATING ONLINE SHOP FOR AUTOMATED ORDER PLACEMENT, PAYMENT, AND SHIPPING

(71) Applicant: Young Mi Yang, Paju-si (KR)

(72) Inventor: Hong Il Park, Incheon (KR)

( * ) Notice: Subject to any disclaimer, the term of this patent is extended or adjusted under 35 U.S.C. 154(b) by 396 days.

(21) Appl. No.: 17/917,559

(22) PCT Filed: Mar. 29, 2021

(86) PCT No.: PCT/KR2021/003873
§ 371 (c)(1),
(2) Date: Oct. 7, 2022

(87) PCT Pub. No.: WO2021/206342
PCT Pub. Date: Oct. 14, 2021

(65) Prior Publication Data
US 2023/0206309 A1 Jun. 29, 2023

(30) Foreign Application Priority Data
Apr. 8, 2020 (KR) ........................ 10-2020-0042890

(51) Int. Cl.
*G06Q 30/00* (2023.01)
*G06Q 10/0831* (2023.01)
(Continued)

(52) U.S. Cl.
CPC ..... *G06Q 30/0635* (2013.01); *G06Q 10/0831* (2013.01); *G06Q 20/12* (2013.01); *G06Q 20/381* (2013.01); *G06Q 30/0283* (2013.01)

(58) Field of Classification Search
CPC ................................................. G06Q 30/0635
See application file for complete search history.

(56) References Cited

U.S. PATENT DOCUMENTS 9,519,926 B2 * 12/2016 Muthu ............... G06Q 30/0625
2002/0120527 A1 * 8/2002 Lam ........................ G06Q 30/06
705/26.61
(Continued)

FOREIGN PATENT DOCUMENTS

KR 10-2011-0076658 7/2011
KR 10-2016-0089122 7/2016
(Continued)

OTHER PUBLICATIONS

Epicor(R) Adds Advanced Shipping Capabilities to Vista End-to-End Integrated Manufacturing Solution. (Year: 2003).*
(Continued)

*Primary Examiner* — Robert M Pond
(74) *Attorney, Agent, or Firm* — ANTONIO HA & U.S. PATENT, LLC

(57) ABSTRACT

The present invention relates to an automated order placement, payment, and shipping system for an online shop, and a method of operating an online shop for automated order placement, payment, and shipping. The automated order placement, payment, and shipping system for an online shop comprises: a product information providing unit for providing product information including product ship-from location information of sellers in different countries; a purchase request receiving unit for receiving, from buyers in different countries, product purchase requests including product ship-to location information; and a product overall payment processing unit which detects the need for international shipping on the basis of a match between the product ship-from location information and the product ship-to location information, calculates a total payment amount by adding shipping cost information to product price information, and executes an overall payment process. The present invention enables one-stop processing of order placement, payment, and shipping across different countries, and can (Continued)

streamline region-specific order processing processes by combining domestic and overseas orders together.

3 Claims, 12 Drawing Sheets

(51) Int. Cl.

| | | |
|---|---|---|
| *G06Q 20/12* | (2012.01) | |
| *G06Q 20/38* | (2012.01) | |
| *G06Q 30/0283* | (2023.01) | |
| *G06Q 30/0601* | (2023.01) | |

(56) References Cited

U.S. PATENT DOCUMENTS

| | | | |
|---|---|---|---|
| 2008/0294536 A1 | 11/2008 | Taylor et al. | |
| 2013/0179340 A1 | 7/2013 | Alba et al. | |
| 2013/0218723 A1* | 8/2013 | Masud .................. | G06Q 30/06 |
| | | | 705/26.62 |

| | | | | |
|---|---|---|---|---|
| 2014/0304103 A1* | 10/2014 | Barton | ............... | G06Q 10/0834 |
| | | | | 705/26.4 |
| 2021/0042724 A1* | 2/2021 | Rathod | ................ | G07G 1/0054 |

FOREIGN PATENT DOCUMENTS

| | | |
|---|---|---|
| KR | 10-2017-0067410 | 6/2017 |
| KR | 10-2018-0054346 | 5/2018 |
| KR | 10-2018-0105066 | 9/2018 |
| KR | 10-2019-0007871 | 1/2019 |
| KR | 10-2019-0116160 | 10/2019 |

OTHER PUBLICATIONS

English Specification of 10-2011-0076658.
English Specification of 10-2019-0116160.
English Specification of 10-2018-0054346.
English Specification of 10-2019-0007871.
English Specification of 10-2017-0067410.
English Specification of 10-2016-0089122.
English Specification of 10-2018-0105066.
English Specification of.

* cited by examiner

FIG. 2

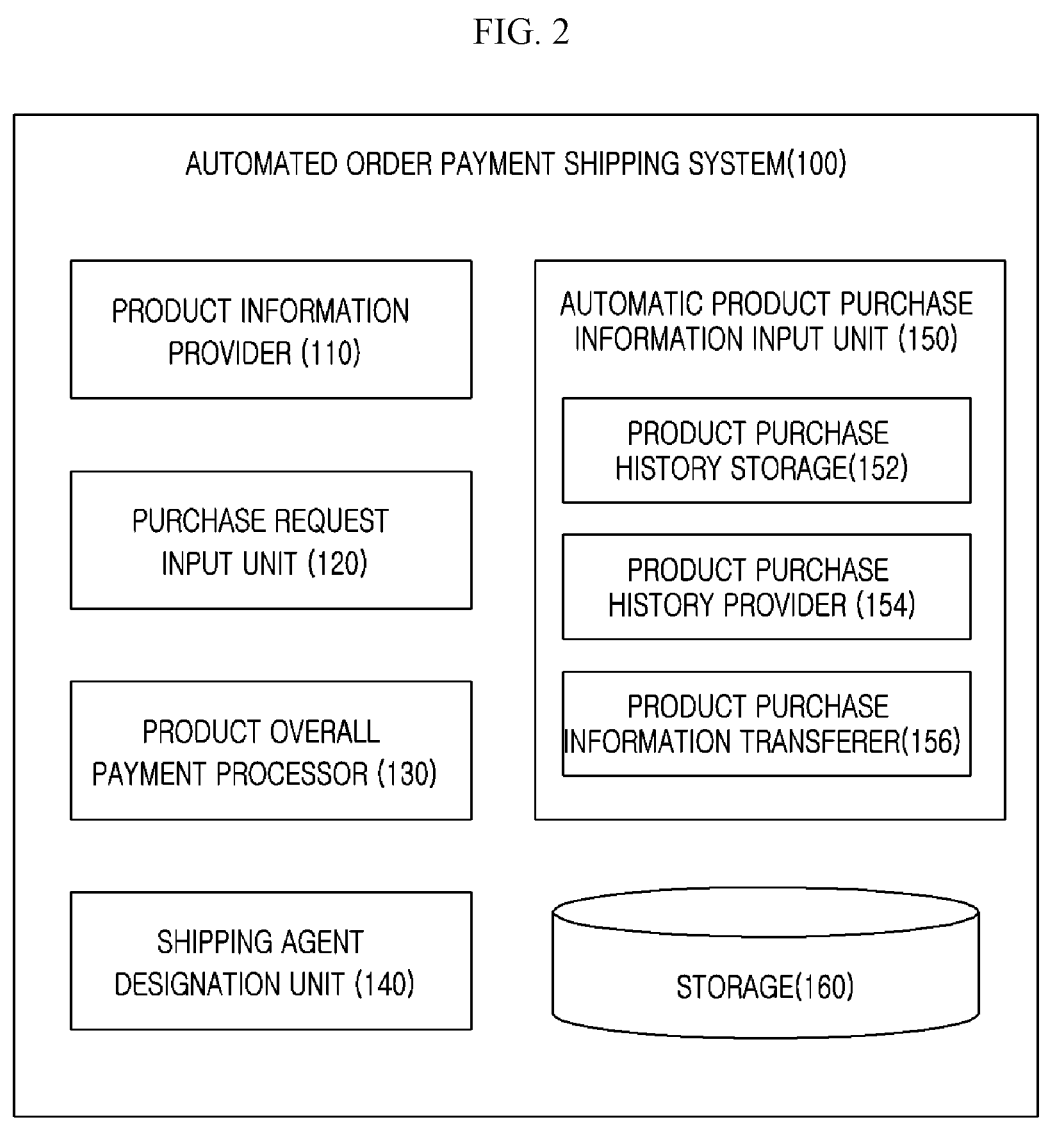

AUTOMATED ORDER PAYMENT SHIPPING SYSTEM(100)

PRODUCT INFORMATION
PROVIDER (110)

PURCHASE REQUEST
INPUT UNIT (120)

PRODUCT OVERALL
PAYMENT PROCESSOR (130)

SHIPPING AGENT
DESIGNATION UNIT (140)

AUTOMATIC PRODUCT PURCHASE
INFORMATION INPUT UNIT (150)

PRODUCT PURCHASE
HISTORY STORAGE(152)

PRODUCT PURCHASE
HISTORY PROVIDER (154)

PRODUCT PURCHASE
INFORMATION TRANSFERER(156)

STORAGE(160)

FIG. 8

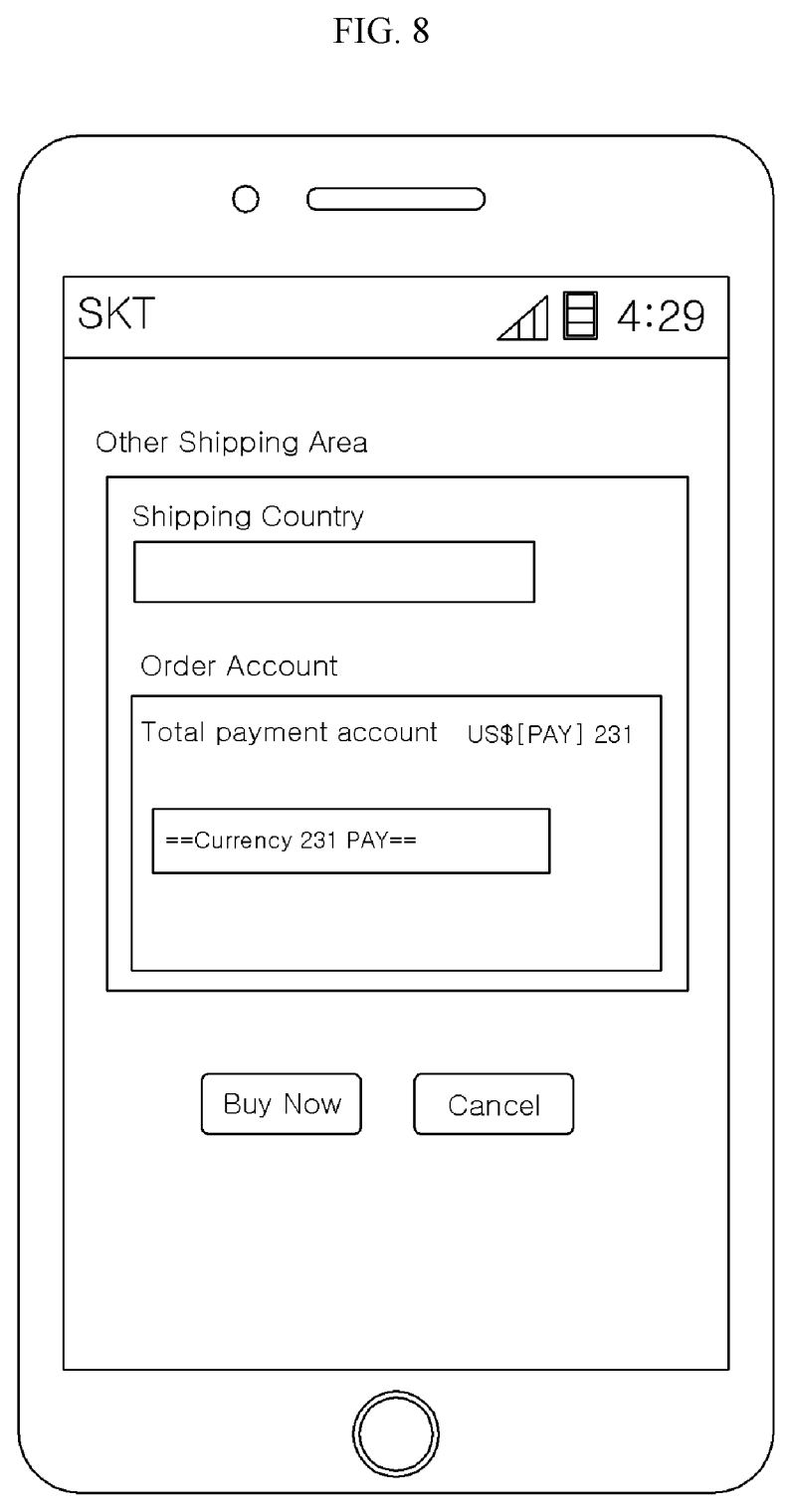

SKT                                    ◢◢ ▤ 4:29

Other Shipping Area

Shipping Country

Order Account

Total payment account    US$[PAY] 231

==Currency 231 PAY==

Buy Now          Cancel

FIG. 11

| Order Number (View Detail) | Order date | Product quantity | Order amount | Unpaid amount | Amount deposited | Delivery charge |
|---|---|---|---|---|---|---|
| 2020012615211798 | 20-01-26 15:21(Sun) | 1 | 10USD(PAY) ¥72元 ▼ | 10USD(PAY) ¥72元 ▼ | Area: USA<br>Free Cost | Chaecking Payment |
| 2020012606581238 | 20-01-26 07:02(Sun) | 2 | 52USD(PAY) ¥374元 ▼ | 10USD(PAY) ¥0元 ▼ | Area: USA<br>Order Amount 30USD(PAY)<br>Weight unit:4<br>Cost:22USD | Payment Completed |

AUTOMATED ORDER PLACEMENT, PAYMENT, AND SHIPPING SYSTEM FOR ONLINE SHOP, AND METHOD OF OPERATING ONLINE SHOP FOR AUTOMATED ORDER PLACEMENT, PAYMENT, AND SHIPPING

TECHNICAL FIELD

The present invention relates to an automated order, payment, and shipping system for an online shopping mall and a method for operating an online shopping mall for automated order, payment, and shipping, and more specifically, to an automated order, payment, and shipping system for an online shopping mall and a method for operating an online shopping mall for automated order, payment, and shipping that automatically recognize domestic and international transactions to collect shipping costs and shipping the product.

BACKGROUND ART

With the development of transportation and technology such as the Internet, global logistics exchanges are becoming more active. Therefore, companies and individuals are increasingly looking for the goods they want abroad.

This is because products that are difficult to obtain domestically can be easily obtained abroad, or even the same product can be purchased at a lower price than the domestic selling price. As a result, there are several companies that provide purchasing services.

Accordingly, overseas shopping malls targeting the domestic market are also increasing. In order for a domestic user to make a payment at an overseas shopping mall, a card capable of overseas payment is essential. In particular, in the case of overseas orders, the order, payment, and shipping procedures are separated, so there are cases where a separate system handles the shipping costs of overseas orders.

In this case, if the overseas orderer lacks expertise in shipping and customs clearance after ordering and payment, it is difficult to place an overseas order.

Accordingly, there are cases where an order is made by applying a product order to a purchasing agency in the region. If so, the purchasing agency places an order through the platform and shipped by the purchasing agency or a shipping company in the region designated by the purchasing agency.

In addition, when ordering from overseas platforms, it is a factor that aggravates users' difficulties because it is procedurally complicated, such as collecting shipping costs and delivering for overseas customers using a separate processing department that is distinct from domestic orders.

PRIOR ART (Patent Document 1) Patent Publication No. 10-2018-0105066 (published date: Sep. 27, 2018)
(Patent Document 2) Patent Publication No. 10-2016-0089122 (published date: Jul. 27, 2016)

DISCLOSURE

Technical Problem

The present invention is derived from such a technical background, and an object of the present invention is to provide an automated order, payment, and shipping system for an online shopping mall and a method for operating an online shopping mall for automated order, payment, and shipping, which processes orders, payment, and shipping between countries in one-stop and integrates domestic and overseas orders to unify the order processing method according to the region.

Technical Solution

The present invention includes the following configuration to achieve above listed objectives.

In order words, an automated order payment shipping system for online shopping malls, according to an embodiment of the present invention, comprises a product information provider configured to provide product information, including product origin information of sellers in each country; a purchase request input unit configured to receive a product purchase request including product shipping address information from a buyer in each country; and a product overall payment processor configured to determines whether overseas shipping is made according to whether the country information of the product origin information is the same as the country information of the product shipping address information, calculate the total payment amount by adding the shipping cost information to the product price information, and perform overall payment processing.

Advantageous Effects

According to the present invention, it derives the effects of being able to provide an automated order payment shipping system for an online shopping mall and a method for operating an online shopping mall for an automated order payment shipping system that can process orders, payments, and shipping between countries in one-stop. It unifies the order processing method according to the region by integrating domestic and overseas orders.

Meanwhile, in the method for operating an online shopping mall performed in the automated order payment shipping system of the online shopping mall, the product information provider provides product information, including product origin information of sellers in each country.

Provided is a method for operating an online shopping mall for automated order payment shipping comprising steps of determining, by purchase request input unit, whether overseas shipping is made according to whether the country information of the product origin information is the same as the country information of the product shipping address information, calculating the total payment amount by adding the shipping cost information to the product price information, and performing overall payment processing.

DESCRIPTION OF DRAWINGS

FIG. 2 is a block diagram showing the configuration of an online shopping mall's automated order payment shipping system according to an embodiment of the present invention.

FIG. 8 is an exemplary view showing the product information input screen received from the purchase request input unit according to an embodiment of the present invention.

FIG. 11 is an exemplary view for explaining the operation of the product purchase information automatic input unit according to an embodiment of the present invention.

MODE FOR INVENTION

It should be noted that the technical terms used herein only describe specific embodiments and are not intended to limit the present invention. In addition, the technical terms used herein should be interpreted as meanings generally understood by those of ordinary skill in the art to which the present invention belongs unless otherwise defined in the present invention. It should not be construed in an overly comprehensive sense or an overly narrow sense.

Hereinafter, the accompanying drawings describe preferred embodiments according to the present invention in detail.

Figure 1:
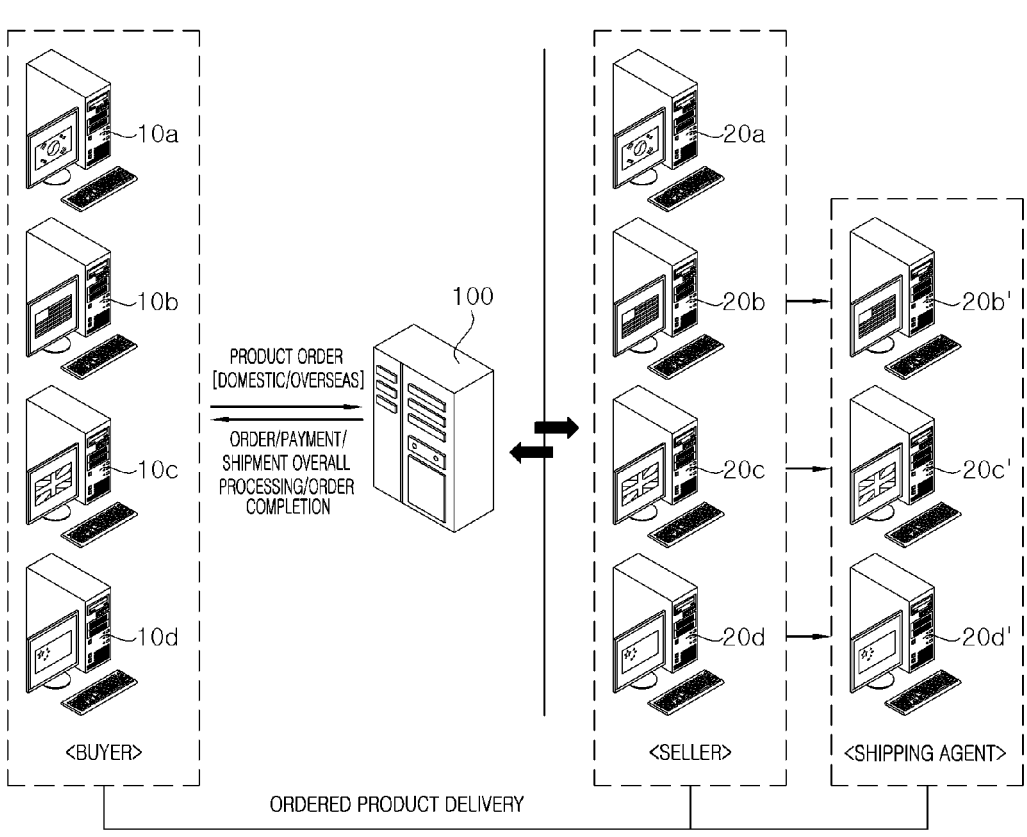
FIG. 1 is a schematic diagram showing the overall configuration relationship of an online shopping mall's automated order payment shipping system according to an embodiment of the present invention.

FIG. 1 is a schematic diagram showing the overall configuration relationship of an online shopping mall's automated order payment shipping system according to an embodiment of the present invention. FIG. 2 is a block diagram showing the configuration of an online shopping mall's automated order payment shipping system according to an embodiment of the present invention.

When buyers of multiple countries purchase products sold by sellers of multiple countries, the automated order payment shipping system 100, according to an embodiment, automatically identifies a buyer country and a seller country and automatically performs the necessary overseas shipping processing procedures between different countries for product purchase request that requires overseas shipping.

In addition, even if the buyer makes a payment in a currency different from the country the seller belongs to, the exchange rate is applied to perform automatic exchange processing. Accordingly, from the point of view of the buyer, it is possible to derive the effect of purchasing products for overseas shipping only by performing the same shipping and payment procedures as when purchasing domestic shipping products.

For example, assuming that the online shopping mall web page or application provided by the automated order payment shipping system 100 of the online shopping mall, according to an embodiment of the present invention is used, Hong Gil-dong, who lives in Korea, can simultaneously add 2 apples and 3 Shin Ramen products from Korea and 1 drone and 3 T-shirts from overseas China to the shopping cart. In addition, 5 Chinese ballpoint pens & 2 Korean kimchi bags can be added to the shopping cart and purchased at once through the payment (purchase) process. There is no difference between the purchase procedure for domestic shipping products and the purchase procedure for overseas shipping products. Accordingly, even when purchasing a product for overseas shipping, the buyer can purchase the product through a simple operation without any additional action.

As shown in FIG. 2, the automated order payment shipping system 100 of the online shopping mall, according to an embodiment, comprises a product information provider 110, a purchase request input unit 120, a product overall payment processor 130, a shipping agent designation unit 140, an automatic product purchase information input unit 150 and a storage 160.

The automated order payment shipping system 100 for an online shopping mall, according to an embodiment of the present invention, may be implemented with a website accessible through an application or a web browser installed on user terminals 10*a*, 10*b*, 10*c*, and the like owned by buyers in each country and the seller user terminals 20*a*, 20*b*, 20*c* and the like, and the user terminal and the management server are connected to each other through a communication network.

In this case, the communication network may be made of Ethernet or a mobile communication network. It may be a communication network that is a high-speed backbone network of a large-scale communication network capable of large-capacity and long-distance voice and data services and may be a next-generation wireless network including Wi-fi, WiGig, wireless broadband internet, WiBro, and world interoperability for microwave access (WiMAX) to provide Internet or high-speed multimedia services. Interconnection is possible through the wired Internet and the mobile communication wireless network.

The Internet refers to a worldwide open computer network structure that provides the TCP/IP protocol and various services existing in its upper layers, namely HTTP (Hyper Text Transfer Protocol), Telnet, FTP (File Transfer Protocol), DNS (Domain Name System), SMTP (Simple Mail Transfer Protocol), SNMP (Simple Network Management Protocol), NFS (Network File Service), NIS (Network Information Service), etc. and provides an environment that allows each user terminal to connect to the shopping mall integrated management server.

Meanwhile, the Internet may be wired or wireless as described above, or in addition, may be a core network integrated with a wired public network, a wireless mobile communication network, or the portable Internet.

If the communication network is a mobile communication network, it may be a synchronous mobile communication network or an asynchronous mobile communication network. As an embodiment of the asynchronous mobile communication network, there may be a wideband code division multiple access (WCDMA) type communication network.

In this case, although not shown in the drawings, the mobile communication network may include a Radio Network Controller (RNC). Meanwhile, although the WCDMA network is taken as an example, it may be a next-generation communication network such as a 3G LTE network, a 4G network, a 5G network, or other IP-based IP networks. This communication network mutually transmits signals and data between each buyer user terminal 10*a*, 10*b*, 10*c*, and the like, the seller user terminal 20*a*, 20*b*, 20*c* and the like, and the automated order payment shipping system 100.

Further, the integrated shopping mall application service may be performed by downloading, installing, and executing an integrated shopping mall-related application program capable of providing integrated shopping mall service, including overseas product registration, as well as overseas product purchase, payment, and shipping for example, through the App Store or management server in each user terminal 10a, 10b, 10c, and the like, 20a, 20b, 20c and the like.

Meanwhile, each user terminal preferably includes at least one smartphone, smart pad, or smart note that communicates through the wireless Internet or the portable Internet. Further, it may comprehensively mean all wired and wireless home appliances/communication devices have an interface for accessing the automated order payment shipping system 100, such as a personal PC, a laptop computer, a Palm PC, a mobile game machine (e.g., mobile play-station), a digital multimedia broadcasting (DMB) phone with a communication function, and a tablet PC.

The product information provider 110 provides product information, including product origin information of the sellers 20a, 20b, 20c and the like of each country through the integrated shopping mall application or web page.

The online shopping mall, according to the present embodiment, is operated in the form of an open market, and accordingly, it is configured so that the sellers 20a, 20b, 20c and the like from around the world can register information on their products and perform sales activities. Sellers from around the world can sell products by registering products in both the country-only version and the world (integrated) version directly in the country in which they are set.

At this time, the product information provider 110, according to an embodiment, uses a GPS signal to identify the seller's latitude and longitude information when the sellers 20a, 20b, and 20c from around the world register information on the product he/she owns. Further, it is implemented to enable the classification and filtering of sellers 20a, 20b, 20c and the like according to country or city information for each seller location through the integrated shopping mall application or web page.

The automated order payment shipping system 100 of the online shopping mall, according to an embodiment, receives input of GPS information or region name information of the sellers 20a, 20b, 20c, and the like from around the world that registers product information with the product information provider 100 to identify the upper-level regional categories.

For example, when a seller inputs "Seocho-dong" as location information while registering information on a product, the automated order payment shipping system 100 of an online shopping mall categorizes and stores location information such as Seocho-gu, Seoul, and Korea as an upper-level concept.

Further, the product type may be input and classified by upper category. For example, when a product type is entered as "one piece," it is possible to categorize and store the upper concepts of women's clothes and fashion.

Figure 3:
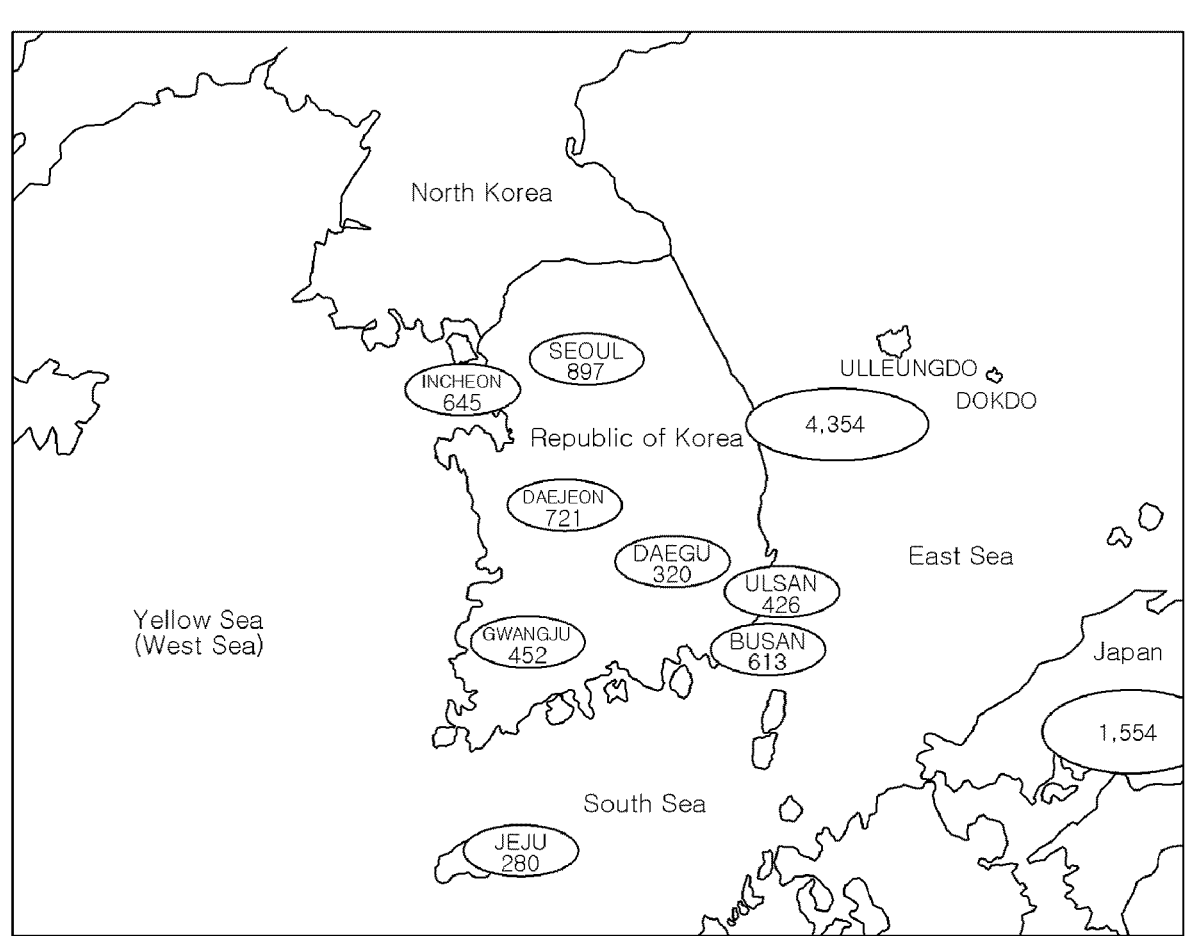
FIG. 3 is an exemplary view showing a screen for providing product information according to a category according to a region classification by the product information provider according to an embodiment of the present invention.

FIG. 3 is an exemplary view showing a screen for providing product information according to a category according to a region classification by the product information provider according to an embodiment of the present invention.

The product information provider 110 may provide product information according to a category for a country, city, and detailed regional classification in which a purchase is desired through an integrated shopping mall application or web page. While the regional scope is gradually reduced, information on sales products can be grasped.

According to an embodiment, purchasing solution implemented in the integrated shopping mall application or web page is equally applied on a map that appears when entering a corresponding classification menu on the same web. A classification menu list may be created in the same way that the web and the map's classification menu are registered as sellers. Further, when the seller clicks on the registered category, the product marker registered in the corresponding category on the world map is automatically registered.

For example, it may be applied to products of various items such as fashion, drones, real estate, hotels, restaurants, pharmacies, hospitals, furniture, food, and shipping food.

In addition, the marker of the location of the registered seller of the corresponding category is implemented to automatically protrude on the map image by clicking on a step-by-step category such as fashion, women's clothes, and one-piece.

In this case, the integrated shopping mall application or web page may provide functions such as product viewing, chatting, purchasing, and following by selecting a marker protruding on the map image.

According to a search request, the product information provider 110 may provide which product is being sold at which location, by location category, or by product category.

According to an embodiment, an online shopping mall seller may manage and sell his/her product through an individual MyShop.

In this case, the individual MyShop of the seller may omit a process in which a product registration procedure is performed by a platform administrator like the existing platform. When the seller directly uploads the product for sale through the individual MyShop, the execution speed of the uploaded item may be significantly increased.

At this time, the part opened as MyShop can be set separately in each language of countries. For example, content uploaded to the MyShop web page can be translated into languages worldwide by applying a Google solution.

When it is uploaded to the webpage of MyShop, the seller can register the product description in the native language on the product photo using the solution provided at the time of product registration. In this case, registration in the native language is generally formed as a text file without the use of Photoshop or a similar tool that generates an image file. At this time, the product description generated in the language of the seller's country on the product photo may be automatically translated and displayed in the language of the buyer who is accessed by the Google solution or unique solution.

Further, a video for product information may be uploaded in the online shopping mall according to an embodiment. At least one video file may be matched to one product and uploaded. For example, product descriptions, advertisement images, or actual usage example images are loaded in the product description.

Figure 4:
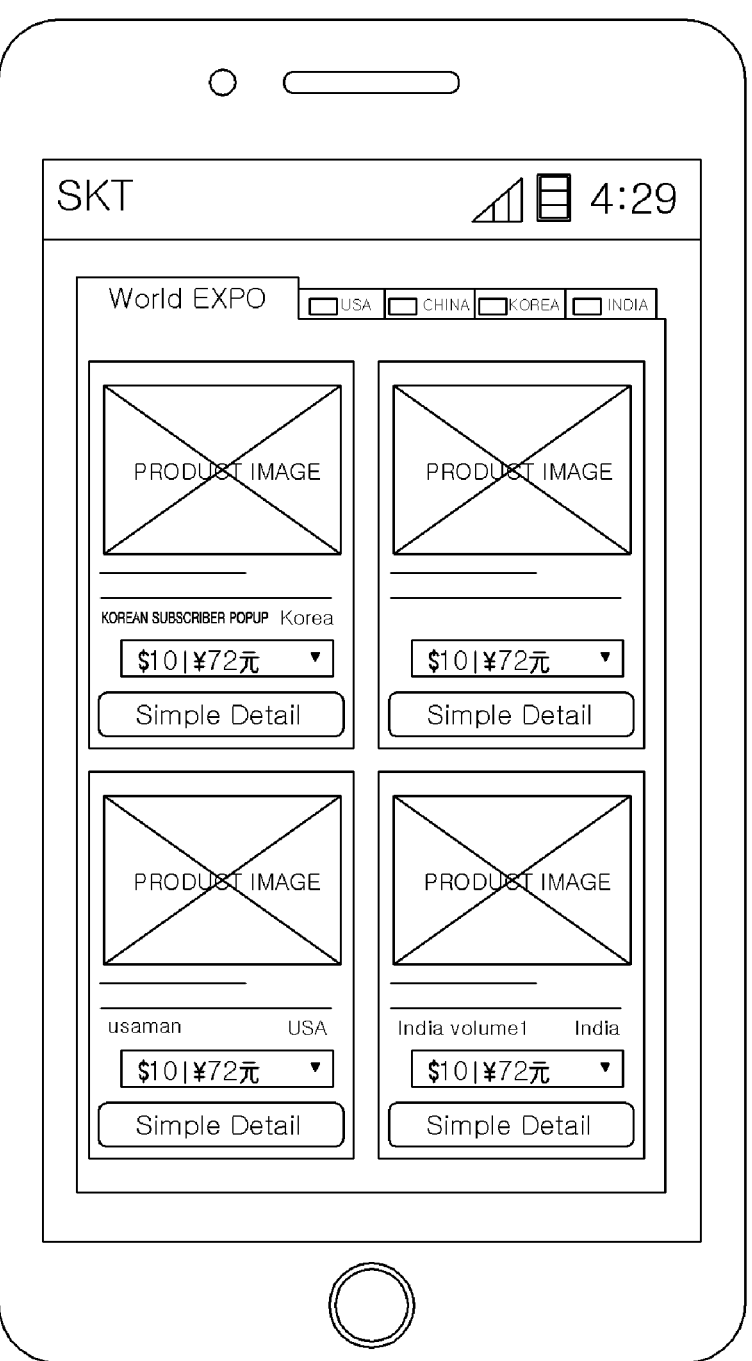
FIGS. 4 and 5 are exemplary views showing a screen on which sales product thumbnail information is provided in a shopping mall application or web page according to an embodiment of the present invention.
Figure 5:
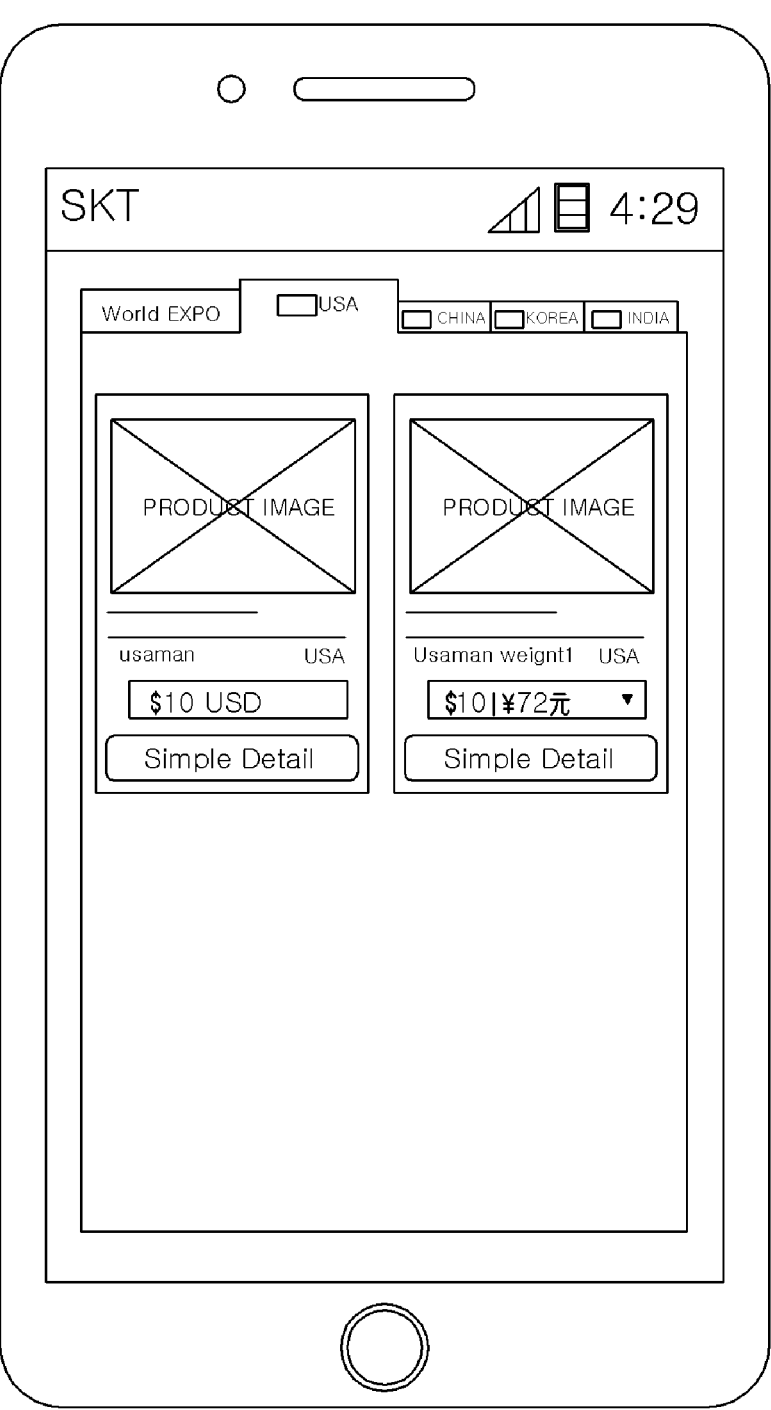

FIGS. 4 and 5 are exemplary views showing a screen on which sales product thumbnail information is provided in a shopping mall application or web page according to an embodiment of the present invention.

The product information provider 110 may provide a list of product thumbnail information registered from sellers in various countries through World EXPO, as shown in FIG. 4. Further, when a seller country is selected, as shown in FIG. 4, it is also possible to extract and provide a list of thumbnail information of registered products from a seller in a specific country.

In one embodiment, a seller in an unset country may register a product only in the World EXPO. Further, in the case of a country set for each sale country, each setting may reflect general trade and special installation costs in an all-inclusive solution in the case of automatic local or non-shipping cost products.

In the case of regional shipping costs, each shipping company may be designated, and invoices may be filled in according to the characteristics of each country's corporate shipping company. Even in the case of overseas shipping, after designating a shipping company, it provides a screen on which relevant information is needed to calculate shipping costs such as weight shipping, volume shipping, general trade, and special installation products provided by the shipping company, as well as size information and weight information for the delivered goods may be input.

Figure 6:
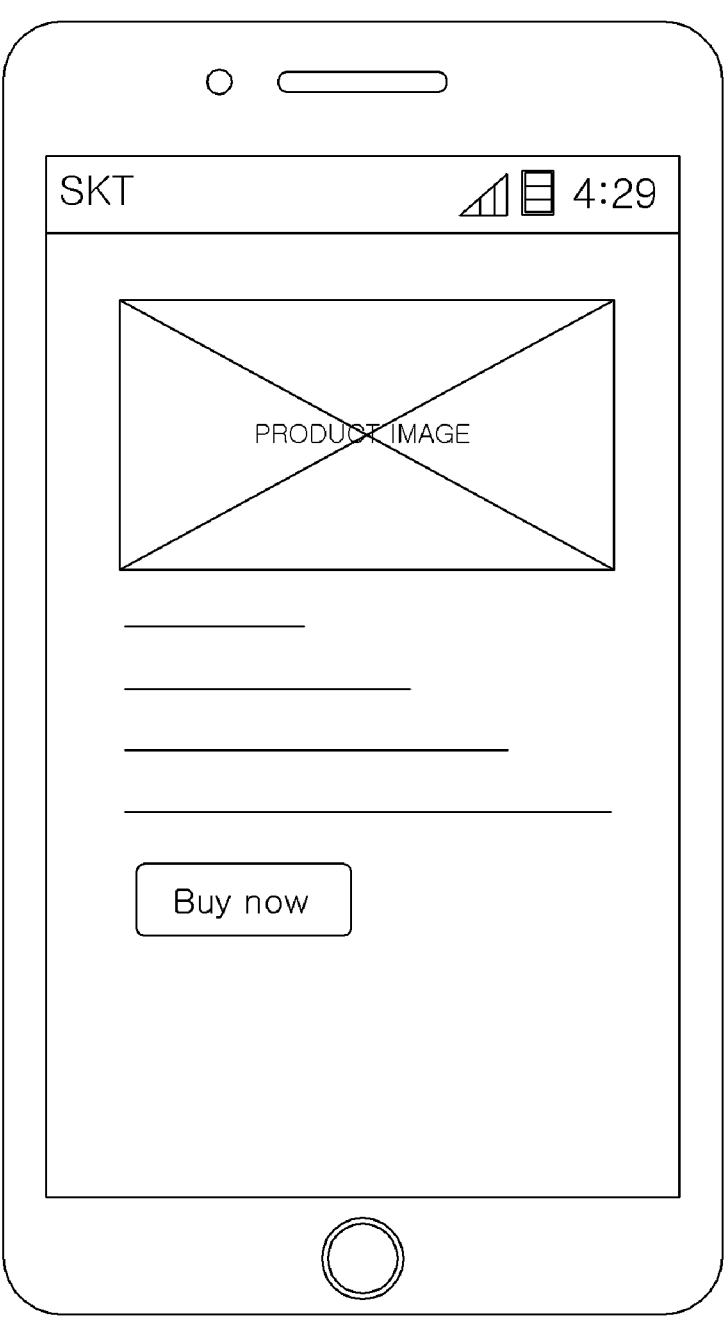
FIGS. 6 and 7 are exemplary views showing a screen on which product information is displayed in a shopping mall application or web page according to an embodiment of the present invention.
Figure 7:
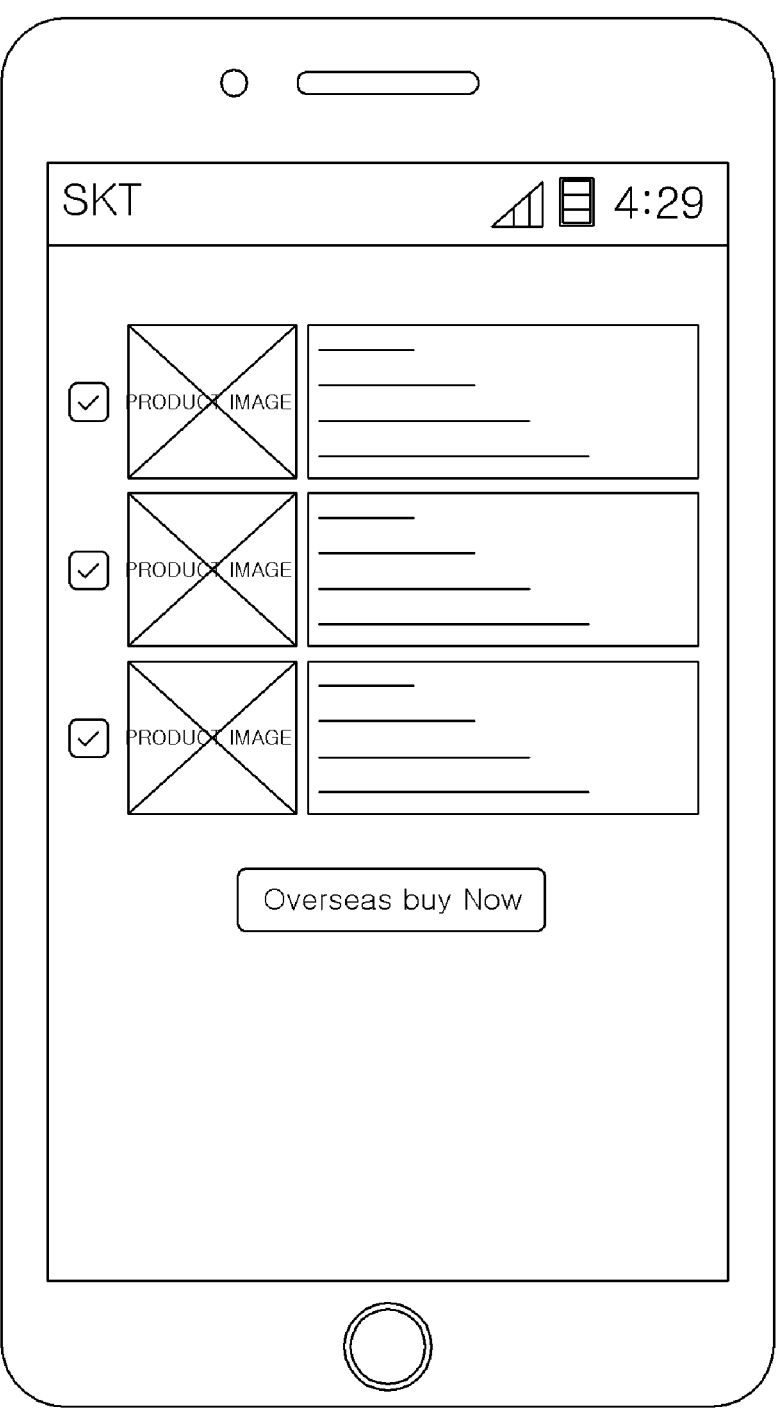

FIGS. 6 and 7 are exemplary views showing a screen on which product information is displayed in a shopping mall application or web page according to an embodiment of the present invention.

The product overall payment processor 130 determines whether it is overseas shipping according to whether the country information of the product origin information and the product shipping address information is the same, calculates the total payment amount by adding the shipping cost information to the price information of the product, and performs the overall payment processing.

The product overall payment processor 130 calculates the shipping cost required for shipping according to the price information of the product and the product origin information selected through the product information provider, 110 and the product shipping address information input in the purchase request input unit 120 to perform overall payment, thereby completing the order for the product.

For example, when selecting the Purchase (Buy Now) button on the product information page, as shown in FIG. 6, the product overall payment processor 130 identifies country information of product origin information and product shipping address information.

According to an embodiment, product origin information may be uploaded by a seller when registering product information. Alternatively, it can be identified based on location information uploaded by the seller. The product shipping address information may be directly input by the buyer or determined based on the location information of the local country where the buyer purchases.

According to an additional aspect of the present invention, the buyer may click the product category on the integrated shopping mall application or the web page to check through the map and the existing purchase.

If it is based on the product's location that the buyer wants to purchase, and when the buyer clicks the 'Move to my area' button, it is automatically moved to the buyer's area.

For example, viewing products from Shenzhen Electronic Market, Dongdaemun Designer Club, Italy, or Louis Vuitton Store, and viewing naengmyeon from Pyongyang Okryug-wan and the like may be checked by selecting the details of contents or products from around the world by clicking a marker using a map. The summary is checked to move to the product details or to purchase directly.

According to an embodiment in the integrated shopping mall application or web page, as shown in FIG. 3, when a marker displayed on a corresponding map is clicked, a page registered by the registrant is displayed as a pop-up window or a separate guide window. The registered page includes product photos, videos, corresponding location maps, chat request button, follow button, seller individual shop move button, and shipping cost details. Through this, the product may be purchased directly, a 1:1 chat may be requested, following is performed, or it may be moved to the seller's individual shop.

All categories such as the corresponding open market (main category, second-tier category, and lower third-tier category are also possible) are classified into the same category with complete automation by simply inputting latitude and longitude when registering the category and seller's product or content on the map so that it appears as a marker location on the map. In other words, the buyer may use both purchase and content used on the map in addition to the existing web method.

For example, if a Chinese seller sells to Korea and specifies Shunfēng Express, EMS, FedEx, Express, etc., the product overall payment processor 130 automatically includes the shipping cost in the buyer's product. It calculates the total payment amount of the product by including the product price, shipping cost, and expenses incurred due to additional individual payments due to trade at the time of ordering.

The storage 160 stores courier-related information and uploaded payment processing information when the seller registers product information.

Further, as shown in FIGS. 6 and 7, it may register and provide various information necessary for the buyer's consumption activities, such as purchase reviews, user manuals, and discount information for the product, as well as information on the product.

In this case, purchase reviews and user manuals may be provided as video files. Further, a list of registered interest products in a cart or shopping cart may be provided configured to enable final purchase confirmation for the corresponding products.

According to the present embodiment, the sales products are mainly products handled by duty-free shops, and other products handled by individual sellers may also be applied as sub-objects.

The purchase request input unit 120 receives input of a product purchase request, including product shipping address information from a buyer around the world through an integrated shopping mall application or a web page.

When the seller places an order for products, the seller may receive the selection of at least one purchase product from the world version in which multi-country sales products are disclosed through the integrated shopping mall application or web page.

Further, as shown in FIG. 7, if the final list information selected as an order product is output. When an Overseas buy now button is selected, the page screen for receiving input of product shipping address information may be transferred.

FIG. 8 is an exemplary view showing the product information input screen received from the purchase request input unit according to an embodiment of the present invention.

In one embodiment, the purchase request input unit 120 and the product overall payment processor 130 are displayed through one web page as shown in FIG. 8 and may complete the order of the product by selecting or inputting each corresponding information. In particular, the buyer is not required to enter information in a special format, as in the case of domestic product purchases, when ordering and paying for overseas product purchases. By unifying order payment and shipping in one stop, even buyers who do not have expertise in shipping and customs clearance can efficiently complete an order with the same procedure for overseas or domestic products.

According to a characteristic aspect of the present invention, the product overall payment processor 130 automatically calculates the tariff according to the selling price information of the buyer's order product, whether there is a duty-free exemption, and the product weight information and calculates the total payment amount by adding additional costs according to the automatically calculated tariff to perform overall payment processing.

Customs clearance for overseas shipping is tax-free for items below a certain amount, which is common in all countries. In this embodiment, the conventional complicated overseas purchase method may be simplified and processed like a domestic purchase by focusing on this point. In particular, an automatic tariff calculation system is established for items that are tax-free under a certain amount (automated substitution of exempt product prices for each country into the solution) as well as items that are subject to customs duties over a certain amount to process the order, payment, and shipping in overseas areas as one-stop processing like domestic order regardless of the item.

In addition, when the product overall payment processor 130 determines that the product is delivered overseas, but the online shopping mall of the seller cannot deliver the product directly from the seller's product origin to the buyer's product shipping address, the shipping agent designation unit 140 receives the selection of at least one of the list of the registered shipping agents 20b', 20c', 20d' to designate a shipping agent. The storage 160 stores a list of shipping agents.

Further, the product overall payment processor 130 calculates the total payment amount by adding the shipping cost according to the designated shipping agent through the shipping agent designation unit 140 and proceeds with the overall payment.

In one aspect, the purchase request input unit 120 receives selection of a product payment national currency type, and the product overall payment processor 130 calculates and notifies the total payment amount by applying an exchange rate based on the national currency selected by the buyer. The storage 160 stores currency standards and exchange rate information for each country.

Figure 9:
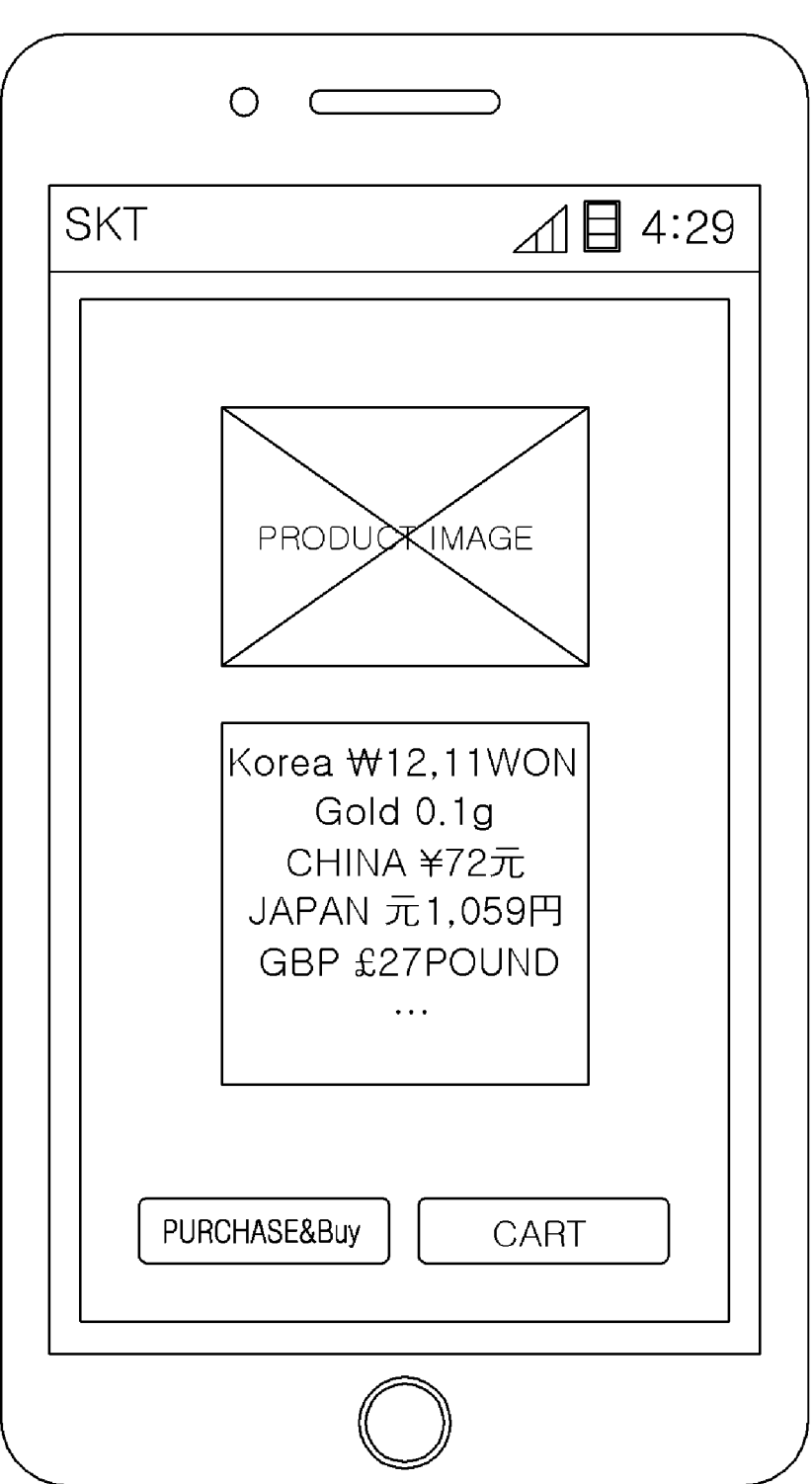
FIG. 9 is an exemplary view showing a screen for receiving a selection of a national currency type when purchasing a product in one embodiment of the present invention.

FIG. 9 is an exemplary view showing a screen for receiving a selection of a national currency type when purchasing a product in one embodiment of the present invention.

In an embodiment, the product overall payment processor 130 may calculate the total payment amount by applying an exchange rate based on at least one national currency standard. In addition, the total payment amount calculated according to at least one national currency standard is displayed. Accordingly, the buyer may select a familiar or advantageous national currency to perform a payment.

At this time, the product overall payment processor 130 may display the product price in various national currencies regarding the global exchange rate.

That is, the automated order payment shipping system 100, according to an embodiment, may maximize convenience by applying the currency value of each country based on the exchange rate of each country for each order, payment, order inquiry, and shipping process.

Further, the product's overall payment processor 130 may process the total payment amount of the product in various forms and methods. For example, product payment can be processed through the platform's pay charging, electronic payment such as PayPal, WeChat, Alipay, Naver Pay, and Kakao Pay, or payment can be processed using various unique payment systems in each country.

The product's overall payment processor 130 pays the product price when a product price payment request is received from the seller upon receipt of the product by the buyer, that is, upon completion of the transaction. At this time, the product overall payment processor 130 is implemented so that the e-commerce law for each country can be separately applied in the payment process of the product price.

Further, each country's tax system (Korean VAT, Chinese value-added tax, other tax, etc.) may be automatically applied and processed for each country separately.

The storage 160 is implemented to store information necessary for each country's e-commerce law and tax processing and to update it with the latest information periodically or by manipulation.

Figure 10:
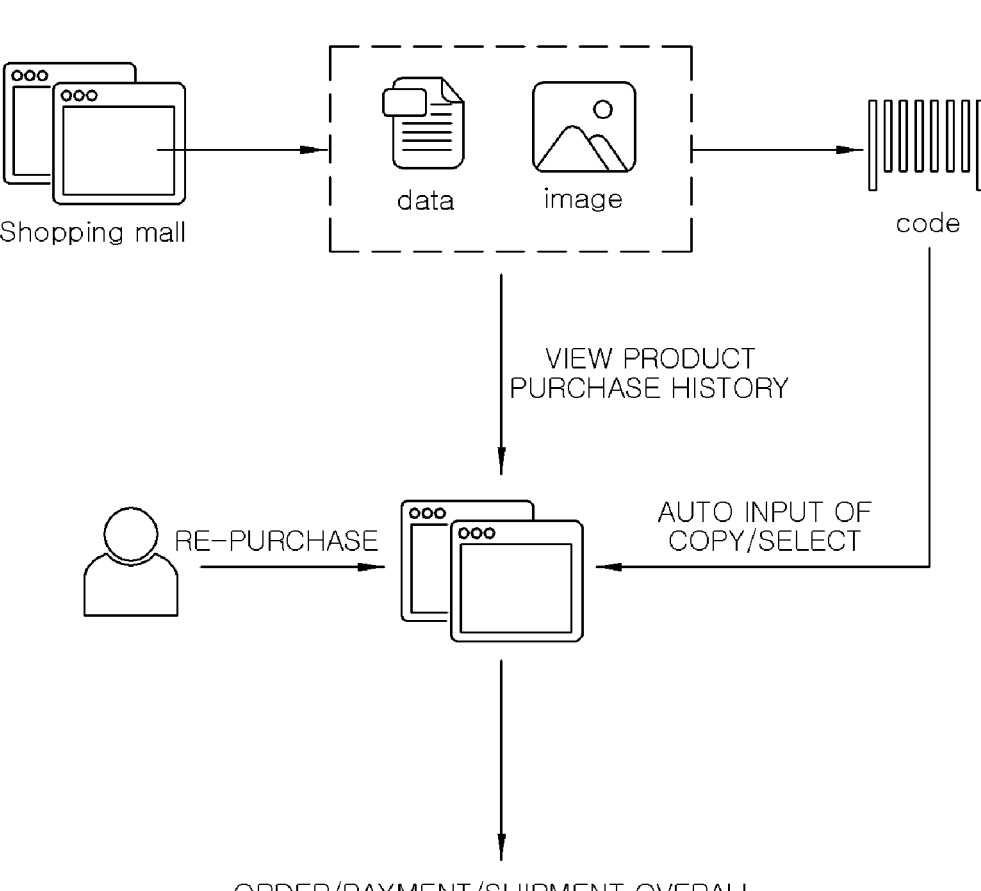
FIG. 10 is an exemplary view showing an order product list according to an embodiment of the present invention.

FIG. 10 is an exemplary view showing an order product list according to an embodiment of the present invention. The buyer provides product order amount, unpaid amount, departure region information, and shipping cost information for the ordered products.

According to an additional aspect of the present invention, the automated order payment shipping system 100 provides a messenger function that enables 1:1 confidential consultation between a buyer and a seller. According to an embodiment, the translation function of, for example, Google solution or Chrome is introduced in chat and product pages to provide a translation in a language that buyers or sellers are familiar with. Accordingly, the language convenience problem may be solved.

Further, both buyers and sellers may be provided with chat lists to logged-in users.

According to an embodiment, the automated order payment shipping system 100 can provide an automatic integrated solution that enables overseas shipping products to be transacted with the same processing process as when purchasing domestic shipping products by breaking down language barriers and regional barriers.

Additionally, it provides the following function to buyers or sellers. In other words, if a buyer likes a seller's product, he/she may follow the seller. Further, when the product registration details of the following seller are updated, the buyer following the seller is notified of this. Therefore, the buyer can receive promptly when a seller he/she follows uploads a new product or sale news.

At this time, the uploaded product content or sale news is automatically translated into the language of the buyer's country and provided, even if a seller uploads the content in a different country than the buyer.

FIG. 11 is an exemplary view for explaining the operation of the product purchase information automatic input unit according to an embodiment of the present invention.

According to an additional aspect of the present invention, the product purchase information automatic input unit 150 may automatically find and input necessary information for each purchase history when repurchasing a product based on the product purchase history.

To this end, the product purchase information automatic input unit 150 may comprise a product purchase history storage 152, a product purchase history provider 154, and a product purchase information transferer 156.

The product purchase history storage 152 extracts the selection and input data of the order payment history of the corresponding product upon completion of the order for each product, captures a screen of the corresponding order payment history, and then saves the extracted data and the captured image as a history file to which different identification codes are assigned according to the order payment completion date and time.

For example, at 10:10 AM on Nov. 19, 2019, when a purchase history of product order origin Korea, product shipping address information USA, shipping agent A, payment method b card, and 3-month installment is created, each input information is extracted, each web page displaying related information may be captured, and they may be stored as one data file. An identification code may be assigned to each data file. At this time, the identification code may be variously formed, such as a QR code, a barcode, a code consisting of a combination of numbers and letters, etc., but does not include product information.

When the identification code issued in this way is re-entered at the time of future purchase of this system, and a product is ordered through the same route, it can be automatically entered without the need to input various information for the processing.

The product purchase history provider 154 provides each history file in the buyer's process of repurchasing the product so that it can be checked together with a corresponding identification code. In other words, the purchase history is different for each product, so information on this may be confirmed by storing the above-described data file, that is, the history file for each purchase date/time, and then providing a pop-up method or a separate list according to the buyer's selection.

Further, the product purchase information transferer 156 copies the corresponding identification code for the selected file among the history files provided through the product purchase history provider 154 and pastes it or manually enters it into a separate input window to automatically select and input information selected and input to the product information provider 110 and the purchase request input unit 120, thereby transferring it to the product overall payment processor 130 so that a general payment for product purchase can be made immediately.

Meanwhile, when the individual buyer separately takes note or memorizes each different identification code, and it is input in advance or stored before purchasing the product, the subsequent information input steps itself may be omitted.

Further, when each different identification code is displayed through the product purchase information transferer 156 with no capture screen displayed, and cursor placed on the identification code or touched once, keywords for the product order origin, product shipping address, and shipping agent information are displayed in a pop-up method to check information related to the identification code more simply.

Figure 12:
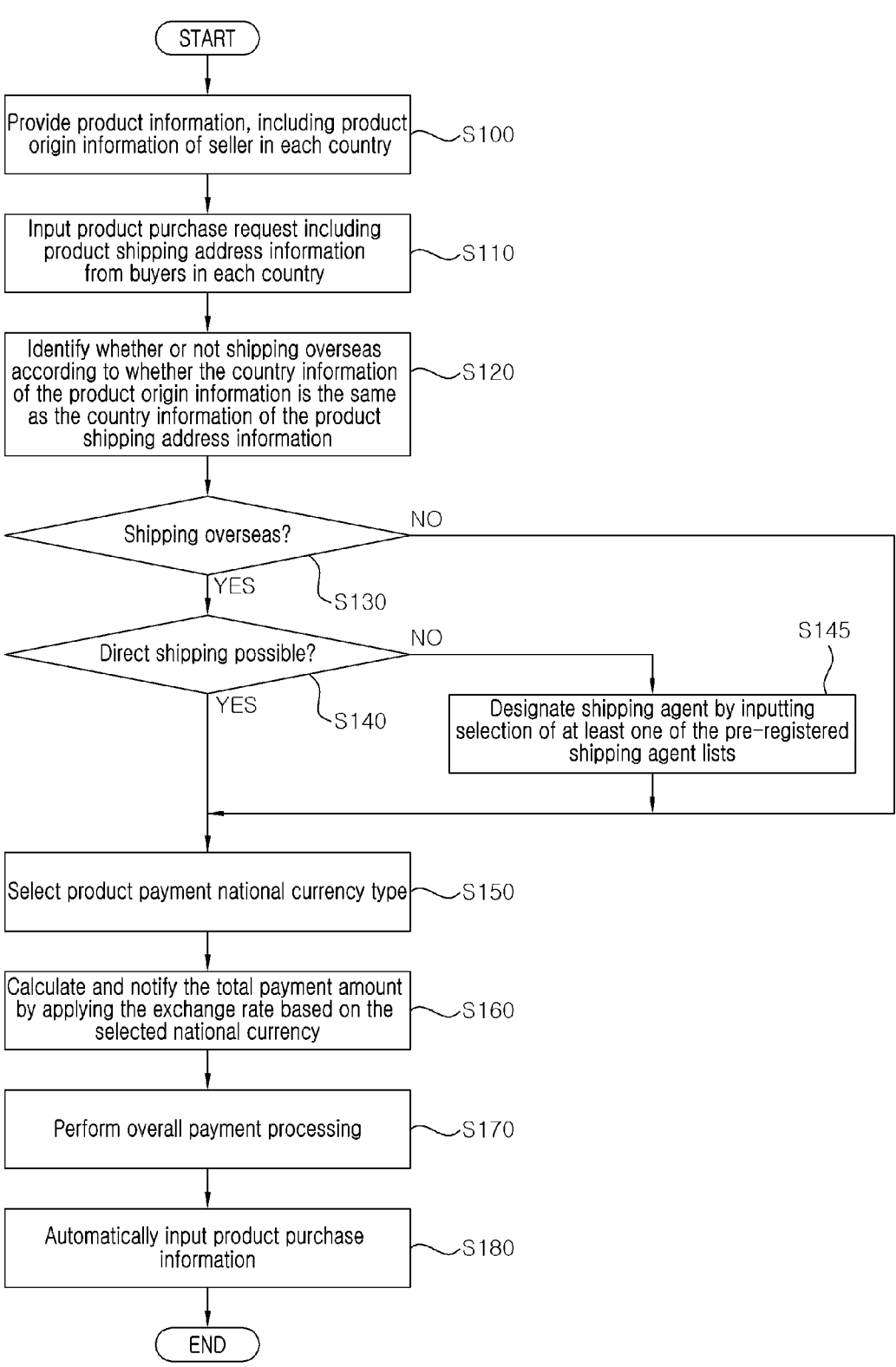
FIG. 12 is a flowchart showing a method for operating an online shopping mall according to an embodiment of the present invention.

FIG. 12 is a flowchart showing a method for operating an online shopping mall according to an embodiment of the present invention. The method for operating an online shopping mall, according to an embodiment, is performed in an automated order payment shipping system of an online shopping mall.

First, the product information provider provides product information, including product origin information of sellers in each country (S100).

In the product information providing step (S100), product information of sellers in each country may be provided through a website. According to the present embodiment, the online shopping mall is operated in the form of an open market, and accordingly, sellers from all over the world may be configured to register information on their products and perform sales activities. Further, as shown in FIGS. 5 and 6, as well as information about the product, various information necessary for the buyer's consumption activities, such as purchase reviews, user manuals, and discount information, may be registered and provided.

Further, it may be configured to provide a list of products of interest, that is, registered interest products in a cart or shopping cart, and to enable final purchase confirmation for the corresponding products. According to the present embodiment, the product for sale is the main target of a product handled by a duty-free customs shop, and other products handled by an individual seller may also be applied as a sub-target.

Further, the purchase request input unit receives input of a product purchase request, including product shipping address information from buyers in each country (S110).

For example, as shown in FIG. 7, after the final list information selected as an order product is checked, a page for inputting product shipping address information may be transferred when an Overseas buy Now button is selected.

As shown in FIG. 8, it is displayed on one web page, and the corresponding information can be selected and inputted to complete the order of the product. In particular, the buyer does not require an input of information in the same format as in the case of domestic product purchases when completing an order and paying for overseas product purchases. Even without a buyer, it is possible to complete an order easily, whether it is an overseas product or a domestic product. Order payment and shipping are processed in one-stop, so even buyers who do not have specialized knowledge about shipping and customs can easily complete an order for both overseas and domestic products.

Afterward, the product's overall payment processor determines whether or not the country information of the product origin information is the same as the country information of the product shipping address information (S120).

Product origin information may be input when a product seller registers a product for sale. However, the present invention is not limited thereto and may be implemented to automatically recognize the country according to the location information of the product seller's terminal. The product shipping address information is based on the address information input by the buyer. Alternatively, it may be implemented to automatically recognize the shipping country according to the location information of the buyer's terminal.

Further, when the product origin country and the product shipping address country are different and identified as overseas shipping (S130), the shipping agent designation unit checks whether direct shipping is possible from the seller's product origin to the buyer's product shipping. Further, when direct shipping is not possible (S140), at least one of the pre-registered shipping agent lists is selected, and a shipping agent is designated (S145).

Thereafter, the product payment national currency type is selected (S150), and the product overall payment processer calculates and notifies the total payment amount by applying an exchange rate based on the buyer's selected national currency (S160).

Then, the total payment amount is calculated by adding the shipping cost information to the price information of the product, and the overall payment processing is performed (S170).

At this time, the step of performing the overall payment process is to automatically calculate the tariff according to the sales price information of the buyer's order product, whether or not to qualify for exemption and the weight information of the product, and calculate the total payment amount by adding cost according to the automatically calculated tariff to perform overall payment processing.

Customs clearance for overseas shipping is tax-free for items below a certain amount, which is common in all countries. In this embodiment, the conventional complicated overseas purchase method may be simplified and processed like domestic purchase by focusing on this point. In particular, an automatic tariff calculation system is established for items that are tax-free under a certain amount (automated substitution of exempt product prices for each country into the solution) as well as items that are subject to customs duties over a certain amount, to process the order, payment and shipping in overseas areas as one-stop processing like domestic order regardless of the item.

Further, through designating the shipping agent, the total payment amount is calculated by adding the shipping cost according to the designated shipping agent, and the overall payment processing is performed. In other words, in the product overall payment processing step, the total payment amount may be calculated by adding the shipping cost according to the designated shipping agent through the shipping agent designation step (S145) to perform the overall payment processing.

Thereafter, when repurchasing a product with purchase history, an automatic product purchase information input step (S180) is performed to automatically find and input necessary information for each purchase history when repurchasing a product based on the product purchase history.

To this end, the step of automatically inputting product purchase information comprises storing a product purchase history, providing a product purchase history, and delivering product purchase information.

In the step of storing a product purchase history, the selection and input data of the order payment history of the corresponding product upon completion of the order for each product are extracted, a screen of the corresponding order payment history is captured, and then extracted data and the captured image are saved as a history file to which different identification codes are assigned according to the order payment completion date and time.

For example, at 10:10 AM on Nov. 19, 2019, when a purchase history of product order origin Korea, product shipping address information USA, shipping agent A, payment method b card, and 3-month installment is created, each input information is extracted, each web page displaying related information may be captured, and they may be stored as one data file. An identification code may be assigned to each data file. At this time, the identification code may be variously formed, such as a QR code, a barcode, a code consisting of a combination of numbers and letters, etc., but does not include product information. When the identification code issued in this way is re-entered at the time of future purchase of this system, and a product is ordered through the same route, it can be automatically entered without the need to input various information for the processing.

In the step of providing a product purchase history, each history file in the process of repurchasing the product by the buyer is provided so that it can be checked together with a corresponding identification code. In other words, the purchase history is different for each product, so information on this may be confirmed by storing the above-described data file, that is, the history file for each purchase date/time, and then providing a pop-up method or a separate list according to the buyer's selection.

In the product purchase information transferer, the corresponding identification code for the selected file among the history files provided through the step of providing the product purchase history S162 is copied and pasted or manually entered into a separate input window to automatically select and input information selected and input through product order origin information and product shipping address information, thereby transferring it to the product overall payment processor so that an overall payment for product purchase can be made immediately.

Meanwhile, when the individual buyer separately takes note or memorizes each different identification code, and it is input in advance or stored before purchasing the product, the subsequent information input steps themselves may be omitted.

Further, when each different identification code is displayed through the step of transferring the product purchase information, with no capture screen displayed, and cursor placed on the identification code or touched once, keywords for the product order origin, product shipping address, shipping agent information are displayed in a pop-up method to check information related to the identification code more simply.

This embodiment implements a world solution rather than a regional concept in the existing system, such as each country in each region. It can sell American products to China in Korea, and the shipping system is also reflected in other seller management systems so that it can be fully automated. It can also be applied between countries or other separate offshore transactions (in the current South and North Korea case, cross-border transactions in federal countries, etc.).

The above-described method may be implemented as an application or in the form of program instructions that may be executed through various computer components to be recorded in a computer-readable recording medium. The computer-readable recording medium may include program instructions, data files, data structures, etc., alone or in combination.

The program instructions recorded on the computer-readable recording medium are specially designed and configured for the present invention and may be known and used by those skilled in the computer software field.

Examples of the computer-readable recording medium include magnetic media such as hard disks, floppy disks and magnetic tapes, optical recording media such as CD-ROMs and DVDs, magneto-optical media such as floppy disks, and hardware devices specially configured to store and execute program instructions such as ROM, RAM, flash memory, and the like.

Examples of program instructions include machine language codes such as those generated by a compiler and high-level language codes that can be executed by a computer using an interpreter or the like. The hardware device may be configured to operate as one or more software modules to perform processing according to the present invention and vice versa.

Although the above has been described regarding the embodiments, it will be understood by those skilled in the art that various modifications and changes can be made to the present invention without departing from the spirit and scope of the present invention, as outlines in the following claims.

The invention claimed is:

1. A method for operating an online shopping mall performed in the online shopping mall's automated order payment shipping system which is implemented with an integrated shopping mall application or a web page, the method comprising steps of:

providing, by a product information provider, product information, including product origin information of sellers in each country;

receiving, by a purchase request input unit, a product purchase request including product shipping address information from buyers in each country; and identifying, by a product overall payment processor, whether or not shipping overseas according to whether country information of the product origin information is the same as country information of the product shipping address information, calculating a total payment amount by adding shipping cost information to the product price information, and performing overall payment processing, wherein the product information provider uses a GPS signal to identify the seller's latitude and longitude information when the seller from around the world registers information on the product, and classifies and filters sellers according to country or city information for each seller location through the integrated shopping mall application or web page, and when the seller clicks on the registered category, a product marker registered in the corresponding category on a world map image is automatically registered, wherein the product marker of the location of the registered seller of the corresponding category automatically protrudes on the world map image by clicking on a step-by-step category, wherein the integrated shopping mall application or web page provides functions including product viewing, chatting, purchasing, and following by selecting the product marker protruding on the world map image, and wherein the purchase request input unit and the product overall payment processor are displayed through one web page, wherein the method further comprises designating a shipping agent by receiving at least one of pre-registered shipping agent lists selected when overseas shipping is identified in performing the overall payment processing, and direct shipping is not possible from the seller's product origin to the buyer's shipping address by shipping agent designation unit, and wherein performing the overall payment processing calculates the total payment amount by adding the shipping cost according to the designated shipping agent by designating the shipping agent to perform the overall payment processing.

2. The method of claim 1, wherein step of receiving the product purchase request comprises step of receiving the product payment based on a national currency type selected, and wherein the product overall payment processor calculates and notifies the total payment amount by applying an exchange rate based on the national currency selected by the buyer.

3. The method of claim 1, wherein step of performing overall payment processing comprises automatically calculating a tariff according to the selling price information of the buyer's order product, whether there is a duty-free exemption, and weight information of the product and calculating the total payment amount by adding additional costs according to the automatically calculated tariff to perform overall payment processing.

* * * * *